(12) United States Patent
Katagake

(10) Patent No.: US 9,638,054 B2
(45) Date of Patent: May 2, 2017

(54) STEAM TURBINE

(71) Applicant: MITSUBISHI HEAVY INDUSTRIES COMPRESSOR CORPORATION, Tokyo (JP)

(72) Inventor: Makoto Katagake, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 437 days.

(21) Appl. No.: 14/346,992

(22) PCT Filed: Sep. 24, 2012

(86) PCT No.: PCT/JP2012/074366
§ 371 (c)(1),
(2) Date: Mar. 25, 2014

(87) PCT Pub. No.: WO2013/047423
PCT Pub. Date: Apr. 4, 2013

(65) Prior Publication Data
US 2014/0234084 A1 Aug. 21, 2014

(30) Foreign Application Priority Data
Sep. 28, 2011 (JP) .................... 2011-211826

(51) Int. Cl.
*F01D 17/14* (2006.01)
*F01D 17/20* (2006.01)
(Continued)

(52) U.S. Cl.
CPC .......... *F01D 17/145* (2013.01); *F01D 17/20* (2013.01); *H02K 7/06* (2013.01); *H02K 7/106* (2013.01);
(Continued)

(58) Field of Classification Search
CPC ........ F01D 17/145; F01D 17/10; F16K 31/04; F16K 31/163
See application file for complete search history.

(56) References Cited

U.S. PATENT DOCUMENTS 528,483 A * 10/1894 Carr .................... F16K 31/1635
251/231
677,940 A * 7/1901 Nixon .................... F16K 1/221
251/231
(Continued)

FOREIGN PATENT DOCUMENTS

CN 1048094 12/1990
CN 1098433 1/2003
(Continued)

OTHER PUBLICATIONS

Chinese Office Action issued Aug. 3, 2015 in corresponding Chinese Patent Application No. 201280046096.4 with English translation.
(Continued)

*Primary Examiner* — Audrey K Bradley
*Assistant Examiner* — Shafiq Mian
(74) *Attorney, Agent, or Firm* — Wenderoth, Lind & Ponack, L.L.P.

(57) ABSTRACT

A steam turbine includes a turbine main body having blades supported rotatably, a steam channel which is connected to the turbine main body and in which steam flows, a regulating valve configured to linearly move to adjust opening/closing of the steam channel, and an opening/closing drive mechanism configured to drive the regulating valve. The opening/closing drive mechanism includes an electric motor configured to rotate by an electric power being supplied, a conversion mechanism configured to convert rotational
(Continued)

motion of the electric motor into linear motion of the regulating valve, and a brake operated by regenerative energy of the electric motor.

11 Claims, 11 Drawing Sheets

(51) Int. Cl.
    *H02K 7/106* (2006.01)
    *H02K 7/06* (2006.01)
    *F16H 25/20* (2006.01)

(52) U.S. Cl.
    CPC .... *F05D 2260/57* (2013.01); *F05D 2260/903* (2013.01); *F05D 2270/46* (2013.01); *F05D 2270/62* (2013.01); *F16H 2025/2075* (2013.01)

(56) References Cited

U.S. PATENT DOCUMENTS

| | | | | |
|---|---|---|---|---|
| 3,684,237 | A | * | 8/1972 | Hyde ............... F16H 21/44 251/232 |
| 3,970,280 | A | * | 7/1976 | Kunz ............... A23N 7/005 251/361 |
| 4,368,520 | A | | 1/1983 | Hwang et al. |
| 5,074,325 | A | * | 12/1991 | Rumberger ........ F01D 17/20 137/15.01 |
| 5,152,316 | A | | 10/1992 | Dorr |
| 5,333,989 | A | * | 8/1994 | Missana .......... F01D 17/10 251/129.04 |
| 5,823,742 | A | * | 10/1998 | Giddings ......... F01D 17/18 137/883 |
| 5,832,944 | A | * | 11/1998 | Lindner .......... F01D 17/145 137/1 |
| 5,855,365 | A | * | 1/1999 | Hong ............. B23Q 3/082 269/27 |
| 5,967,486 | A | * | 10/1999 | McCrory ........ F16K 31/163 251/232 |
| 6,431,017 | B1 | * | 8/2002 | Robadey ........ B65H 3/62 74/45 |
| 6,438,962 | B1 | | 8/2002 | Blain et al. |
| 6,953,185 | B2 | | 10/2005 | Steinborn |
| 2004/0076509 | A1 | * | 4/2004 | Steinborn ........ F16K 31/047 415/13 |
| 2007/0075285 | A1 | | 4/2007 | Lovejoy |
| 2009/0309522 | A1 | | 12/2009 | Seo |
| 2011/0180160 | A1 | * | 7/2011 | Froehlich ........ F15B 1/022 137/455 |

FOREIGN PATENT DOCUMENTS

| | | | |
|---|---|---|---|
| CN | 101145756 | | 3/2008 |
| CN | 101567602 | | 10/2009 |
| EP | 0 221 495 | | 5/1987 |
| EP | 1 902 947 | | 3/2008 |
| JP | 58-186349 | | 10/1983 |
| JP | 58186349 A | * | 10/1983 |
| JP | 59-221407 | | 12/1984 |
| JP | 61-215403 | | 9/1986 |
| JP | 05-010103 | | 1/1993 |
| JP | 07-019006 | | 1/1995 |
| JP | 8-232607 | | 9/1996 |
| JP | 2002-507711 | | 3/2002 |
| JP | 2004-515722 | | 5/2004 |
| JP | 2005-106062 | | 4/2005 |
| JP | 2005106062 A | * | 4/2005 |
| JP | 2007-211683 | | 8/2007 |
| JP | 2010-106999 | | 5/2010 |
| WO | 2005/029683 | | 3/2005 |

OTHER PUBLICATIONS

Extended European Search Report issued Aug. 31, 2015 in corresponding European Patent Application No. 12836140.9.
Chinese Office Action issued Feb. 4, 2015 in corresponding Chinese Patent Application No. 201280046096.4 with English translation.
International Search Report issued Dec. 4, 2012 in International (PCT) Application No. PCT/JP2012/074366 with English translation.
Written Opinion of the International Searching Authority issued Dec. 4, 2012 in International (PCT) Application No. PCT/JP2012/074366 with English translation.
Japanese Notice of Allowance issued Dec. 1, 2015 in corresponding Japanese Patent Application No. 2011-211826 with English translation.

\* cited by examiner

STEAM TURBINE

FIELD OF THE INVENTION

The present invention relates to a steam turbine that is rotatably driven by steam.

Priority is claimed on Japanese Patent Application No. 2011-211826, filed on Sep. 28, 2011, the content of which is incorporated herein by reference.

BACKGROUND ART

Steam turbines are each equipped with a turbine main body having a rotor that is used for mechanical drive and is rotatably supported. Steam acting as a working fluid is supplied to the turbine main body, and thereby the rotor is rotatably driven. In the steam turbine, the steam supplied to the turbine main body or steam extracted from the turbine main body flows in a steam channel. The steam channel is provided with a regulating valve, and the regulating valve adjusts opening/closing of the steam channel, thereby regulating a flow rate of steam. To drive the regulating valve, a hydraulic servomechanism is widely used (e.g., see Patent Literature 1).

Here, FIG. 11 is a schematic view showing a configuration of a conventional steam turbine 80. The steam turbine 80 includes a turbine main body 81 driving a compressor, a steam channel 82 supplying steam to the turbine main body 81, a regulating valve 83 that is provided for the steam channel 82 and adjusts opening/closing of the steam channel 82, a lever member 84 which is rotatably supported and to which one end of the regulating valve 83 is fixed, a hydraulic servomechanism 85 driving the regulating valve 83 via the lever member 84, and an electronic governor 86 controlling an operation of the hydraulic servomechanism 85 based on a rotation speed detected from the turbine main body 81 and an instruction input from a control panel.

Here, the hydraulic servomechanism 85 has, as shown in FIG. 11, a piston 87, one end of which is fixed to the lever member 84, a hydraulic cylinder 88 housing the piston 87, a pilot valve 89 supplying hydraulic oil to the hydraulic cylinder 88, and an actuator 90 driving the pilot valve 89. According to the hydraulic servomechanism 85 configured in this way, when the hydraulic oil is supplied from the pilot valve 89 below the piston 87 in the hydraulic cylinder 88, the piston 87 moves upward, and thereby the lever member 84 is rotated to force a tip thereof to move up. Thereby, the regulating valve 83 fixed to the lever member 84 also moves up, and the steam channel 82 is opened. Thereby, the steam is supplied from the steam channel 82 to the turbine main body 81.

In contrast, when the hydraulic oil is supplied from the pilot valve 89 above the piston 87 in the hydraulic cylinder 88, the piston 87 moves downward, and thereby the lever member 84 is rotated to force the tip thereof to move down. Thereby, the regulating valve 83 fixed to the lever member 84 also moves down, and the steam channel 82 is closed. Thereby, the supply of the steam from the steam channel 82 to the turbine main body 81 comes to a stop.

Here, FIG. 12 is a schematic perspective view showing an installed state of a conventional hydraulic servomechanism 85. Typically, a facility installing space inside a facility building is for the most part occupied by a machine to be driven and a turbine main body. The hydraulic servomechanism 85 requires a space in a downward direction of the lever member 84 because the lever member 84 is operated up and down. However, as described above, since most of the installing space is occupied by the machine to be driven and the turbine main body, it is difficult for only the hydraulic servomechanism 85 to occupy the space below the lever member 84. For this reason, the piston 87 and the hydraulic cylinder 88 directly operating the lever member 84 are disposed directly under the lever member 84, whereas the pilot valve 89 and actuator 90 are installed on the bearing cover 91, thereby securing the installing space. The bearing cover 91 houses a bearing that functions to rotatably support a rotating shaft constituting the rotor of the turbine main body 81.

RELATED ART DOCUMENT

Patent Document

[Patent Literature 1]

Japanese Unexamined Patent Application, First Publication No. H07-19006

DISCLOSURE OF THE INVENTION

Problems to be Solved by the Invention

However, the steam turbine 80 using the hydraulic servomechanism 85 to drive the regulating valve 83 as set forth in Patent Literature 1 has the following problems.

First, the oil is used as the working fluid of the hydraulic servomechanism 85, and thereby high output and quick response are obtained. However, since a relatively high oil pressure is needed, the hydraulic cylinder 88 and various pipes require sufficient strength to withstand the oil pressure. This causes an increase in size and weight of the steam turbine 80 as a whole, and leads to an increase in cost associated with an increase in material cost.

Further, the steam turbine 80 is continuously operated over a long period of time. Accordingly, there is a possibility of deterioration over time occurring at packing that seals parts of the hydraulic servomechanism 85. Further, there is a possibility of looseness over time occurring even at joints that connect parts of the hydraulic servomechanism 85. For this reason, there is a need to take measures to prevent leakage of the hydraulic oil which is caused by these. Further, there is a need to take measures against fire. Accordingly, a mechanism that reliably continues to drive the regulating valve 83 without being affected by long-term operation of the steam turbine 80 is required.

Further, as shown in FIG. 12, the pilot valve 89 and the actuator 90 of the hydraulic servomechanism 85 are installed on the bearing cover 91. Accordingly, whenever the bearing cover 91 is opened for maintenance work of the bearing (not shown) housed in the bearing cover 91, work of separating the pilot valve 89 and the actuator 90 from the lever member 84 and then demounting them from the top of the bearing cover 91 is required. Thus, the maintenance work of the bearing takes much effort.

In addition, when the hydraulic oil supplied to the hydraulic servomechanism 85 is compared with the oil supplied to the bearing, an oil quantity thereof is small, but high oil pressure is required. Accordingly, an oil console that collectively manages the oil for the hydraulic servomechanism 85 and the oil for the bearing is made up of a line that boosts the oil of the total flow rate to high oil pressure for the hydraulic servomechanism 85, and then reduces it to low oil pressure for the bearing. Thus, a high-powered pump and motor are required for the oil console, thereby leading to an increase in cost and an increase in size and weight of the steam turbine 80 as a whole.

The present invention provides a steam turbine in which a regulating valve regulating an amount of steam can be stably driven over a long period of time, and an opening/closing drive mechanism of the regulating valve does not interfere with maintenance work of a bearing.

Solution to Problem

A steam turbine according to a first aspect of the present invention includes a turbine main body having blades supported rotatably, a steam channel which is connected to the turbine main body and in which steam flows, a regulating valve configured to linearly move to adjust opening/closing of the steam channel, and an opening/closing drive mechanism configured to drive the regulating valve. The opening/closing drive mechanism includes an electric motor configured to rotate by an electric power being supplied, a conversion mechanism configured to convert rotational motion of the electric motor into linear motion of the regulating valve, and a brake operated by regenerative energy of the electric motor.

With this configuration, the rotation caused by the electric motor is converted into the linear motion by the conversion mechanism, and thereby the regulating valve can be opened/closed. For this reason, a hydraulic servomechanism is not required, and a means for preventing leakage of hydraulic oil is not required. Further, since an actuator supplying the hydraulic oil or a sealing valve mechanism is not required, it is unnecessary to use a space above a bearing cover as an installation space. Further, since the hydraulic oil can be used for only bearings, the hydraulic oil can be used at a relatively low pressure, and an oil console can be made small. Here, when power supply to the electric motor is stopped, the regulating valve is forcibly operated in a closing direction by a mechanical means. Accordingly, the conversion mechanism converts the linear motion operating the regulating valve in a closing direction into the rotational motion, and the electric motor is rotated in a direction opposite to a rotating direction in which it is typically driven. Here, the opening/closing drive mechanism includes the brake operated by regenerative energy of the electric motor. For this reason, when the power supply to the electric motor is stopped, and the electric motor is rotated in a reverse direction, the regenerative energy occurs at the electric motor, and the brake is operated using the regenerative energy as power. For this reason, a rotation speed of the electric motor is prevented from being excessive. Thereby, it is possible to prevent excessive heat from occurring at the conversion mechanism converting the rotational motion of the electric motor into the linear motion of the regulating valve, thereby preventing occurrence of burn-in.

Further, in a steam turbine according to a second aspect of the present invention, the conversion mechanism may include a ball screw that is rotatably driven by the electric motor, and a nut that is screwed with the ball screw and is connected to the regulating valve.

With this configuration, as the ball screw is rotated, the nut screwed with the ball screw performs linear motion along the ball screw, and the regulating valve connected to the nut also performs linear motion. Thereby, the rotational motion of the electric motor can be converted into the linear motion of the regulating valve by a simple configuration, namely the ball screw and the nut. Further, the opening/closing drive mechanism is simplified in configuration, and thereby an installation space thereof can be reduced. When the power supply to the electric motor is stopped, the regulating valve is operated in the closing direction. Thereby, the nut performs the linear motion in the corresponding direction. Thus, the ball screw with which the nut is screwed and the electric motor to which the ball screw is connected are forcibly rotated in a direction opposite to a rotating direction in which they are typically driven. In this case, the rotation of the electric motor is restricted by the brake. As such, even when the ball screw is rotated by the linear motion of the nut, it is possible to prevent the ball screw and the nut from undergoing burn-in.

Further, in a steam turbine according to a third aspect of the present invention, the electric motor may be housed in a motor housing whose interior is tightly closed.

With this configuration, since the electric motor is isolated from surrounding oil, the electric motor can be formed in an explosion-proof structure.

Further, a steam turbine according to a fourth aspect of the present invention may further include a spare opening/closing drive mechanism configured to drive the regulating valve when the opening/closing drive mechanism fails.

With this configuration, even when the opening/closing drive mechanism fails, the spare opening/closing drive mechanism drives the regulating valve in place of the opening/closing drive mechanism. As such, a continuous operation of the steam turbine is made possible. Thereby, the operation of the steam turbine having high reliability is made possible.

Further, a steam turbine according to a fifth aspect of the present invention may further include a controller unit configured to control an operation of the opening/closing drive mechanism or the spare opening/closing drive mechanism.

With this configuration, the operation of the opening/closing drive mechanism and the operation of the spare opening/closing drive mechanism are controlled by the common controller unit. Thereby, the configuration of the steam turbine can be simplified.

Further, a steam turbine according to a sixth aspect of the present invention may further include a spare controller unit configured to control the operation of the opening/closing drive mechanism or the spare opening/closing drive mechanism when the controller unit fails.

With this configuration, even when the controller unit fails, the spare controller unit controls the operation of the opening/closing drive mechanism or the spare opening/closing drive mechanism in place of the controller unit. As such, the continuous operation of the steam turbine is made possible. Thereby, the operation of the steam turbine having high reliability is made possible.

Further, in a steam turbine according to a seventh aspect of the present invention, the brake may be operated when a circumferential speed of the ball screw is increased beyond a threshold, or for a given time after the supply of power to the electric motor is stopped.

With this configuration, during normal operation, and when power is supplied to the electric motor, the brake is operated only when the circumferential speed of the ball screw is excessively increased. Thereby, the rotation speed of the electric motor is suppressed. Thus, it is possible to prevent excessive heat from occurring at the conversion mechanism, thereby preventing occurrence of burn-in. Meanwhile, when the supply of the power to the electric motor is stopped during a blackout or the like, the steam channel is closed, and a failsafe function of immediately stopping the steam turbine works. Then, immediately after the regulating valve initiates a closing operation, the circumferential speed of the ball screw is increased. Accordingly, the brake is operated for a given time after the supply of power is stopped, and the rotation speed of the electric motor is suppressed. Thereby, it is possible to prevent excessive heat from occurring at the conversion mechanism, thereby preventing occurrence of burn-in. Furthermore, after the given time after the supply of power is stopped has elapsed and the circumferential speed of the ball screw is decreased, the brake is stopped, and thereby the closing operation of the steam channel caused by the regulating valve is rapidly performed. Thereby, it is possible to prevent a dangerous situation from occurring at a stop operation of the steam turbine caused by a delayed closing of the steam channel.

Further, a steam turbine according to an eighth aspect of the present invention may further include a coupling configured to separably connect the nut and the regulating valve, and a locking mechanism configured to immovably lock the regulating valve.

With this configuration, when the opening/closing drive mechanism fails and needs to be exchanged, the regulating valve is immovably locked by the locking mechanism with the steam channel kept open, and then the coupling is separated to release the connection of the nut and the regulating valve. Thereby, with the operation of the steam turbine kept up, it is possible to demount the opening/closing drive mechanism and exchange or repair the opening/closing drive mechanism.

Further, a steam turbine according to a ninth aspect of the present invention may further include an auxiliary opening/closing drive mechanism configured to drive the regulating valve along with the opening/closing drive mechanism when high output exceeding a reference value is required to drive the regulating valve.

With this configuration, when the high output is required to drive the regulating valve as in initiating the opening of the steam channel, the regulating valve is driven using both the opening/closing drive mechanism and the auxiliary opening/closing drive mechanism. In contrast, when the high output is not required to drive the regulating valve as in the normal operation or as in closing the steam channel, the regulating valve may be driven only by the opening/closing drive mechanism. In this way, the regulating valve is driven with the required output depending on the operation state. Thereby, it is possible to promote energy saving.

Advantageous Effects of Invention

According to the steam turbine according to the present invention, the regulating valve regulating the amount of the steam can be stably driven over a long period of time, and the opening/closing drive mechanism of the regulating valve does not interfere with maintenance work of bearings.

MODE FOR CARRYING OUT THE INVENTION

First Embodiment

Figure 1:
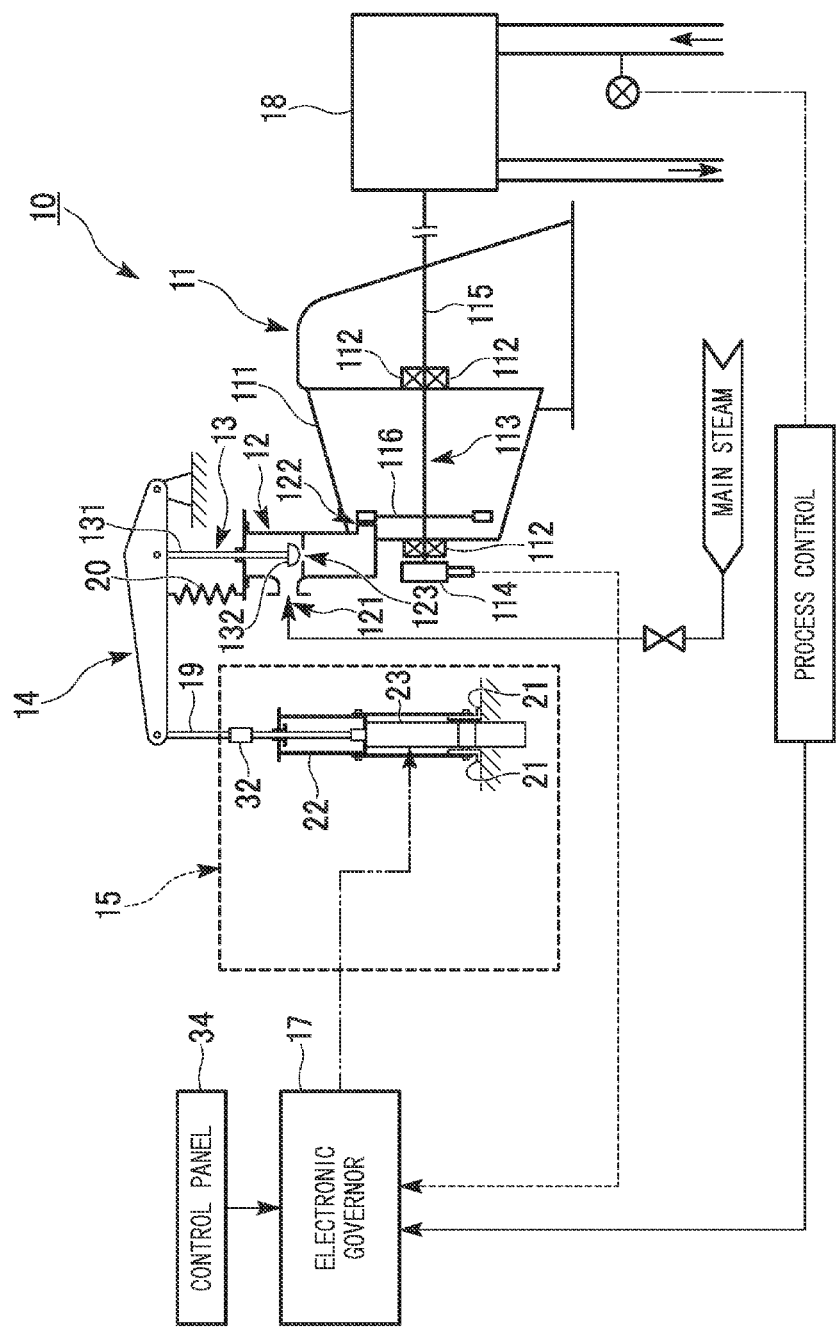
FIG. 1 is a schematic view showing a configuration of a steam turbine according to a first embodiment of the present invention.

Hereinafter, embodiments of the present invention will be described with reference to the accompanying drawings. First, a configuration of a steam turbine according to a first embodiment of the present invention will be described. FIG. 1 is a schematic view showing a configuration of a steam turbine 10 according to a first embodiment.

As shown in FIG. 1, the steam turbine 10 of the present embodiment includes a turbine main body 11, a steam channel 12, a regulating valve 13, a lever member 14, an opening/closing drive mechanism 15, a locking mechanism 16 (shown in FIGS. 4 to 6), and an electronic governor 17.

(Turbine Main Body)

As shown in FIG. 1, the turbine main body 11 has a tubular casing 111, bearings 112 provided for the casing 111, a rotor 113 that is rotatably supported on the bearings 112 and is disposed inside the casing 111, and a speed-detecting sensor 114 detecting a rotation speed of the rotor 113. The rotor 113 is equipped with a rotating shaft 115 and blades 116 fixed to the rotating shaft 115. The blades 116 configured in this way are rotated by steam, and a compressor 18 is driven by a rotating force of the blades 116.

(Steam Channel)

The steam channel 12 functions to supply the steam to the turbine main body 11. As shown in FIG. 1, the steam is introduced from a steam introduction opening 121 of the steam channel 12, and a steam supply opening 122 of the steam channel 12 is connected to the turbine main body 11. Further, a throttling hole 123 is formed between the steam introduction opening 121 and the steam supply opening 122. The throttling hole 123 makes width of the steam channel 12 narrower.

In the present embodiment, the "steam channel" according to the present invention has been described with the channel in which the steam supplied to the turbine main body 11 flows as an example. However, the steam channel 12 is not limited thereto, and may be, for instance, the channel in which the steam extracted from the turbine main body 11 flows.

(Regulating Valve)

The regulating valve 13 functions to regulate an amount of the steam supplied to the turbine main body 11. As shown in FIG. 1, the regulating valve 13 is configured so that a sealing member 132 having an approximately semicircular shape is installed on one end of a rod-like arm member 131, and the other end of the arm member 131 is fixed to a longitudinal intermediate portion of the lever member 14. According to the regulating valve 13 configured in this way, as the arm member 131 linearly moves along the steam channel 12, the sealing member 132 of the tip of the arm member 131 is fitted into or separated from the throttling hole 123 of the steam channel 12. Thereby, an opening diameter of the throttling hole 123 is changed, and a flow rate of the steam supplied to the turbine main body 11 via the throttling hole 123 is adapted to be changed.

(Lever Member)

The lever member 14 functions to transmit output of the opening/closing drive mechanism 15 to the regulating valve 13. As shown in FIG. 1, a longitudinal base end of the lever member 14 is rotatably supported, and one end of a lever-side rod 19 is fixed to a longitudinal tip of the lever member 14. Further, as described above, the other end of the arm member 131 constituting the regulating valve 13 is fixed to the longitudinal intermediate portion of the lever member 14. Furthermore, one end of a tension spring 20 acting as a forcible closing means for forcibly closing the regulating valve 13 is attached to a tip side of the lever member 14 which is located at a far side from the fixed position of the arm member 131. The other end of the tension spring 20 is immovably fixed. In a state in which no external force is applied, the tension spring 20 applies a tensile force to the lever member 14 in a direction in which the lever member 14 is rotated counterclockwise in FIG. 1.

(Opening/Closing Drive Mechanism)

The opening/closing drive mechanism 15 functions to drive the regulating valve 13. As shown in FIG. 1, the opening/closing drive mechanism 15 has a pair of fixedly installed brackets 21, a holding member 22 rotatably supported by these brackets 21, and an electric actuator 23 held by the holding member 22.

Figure 2:
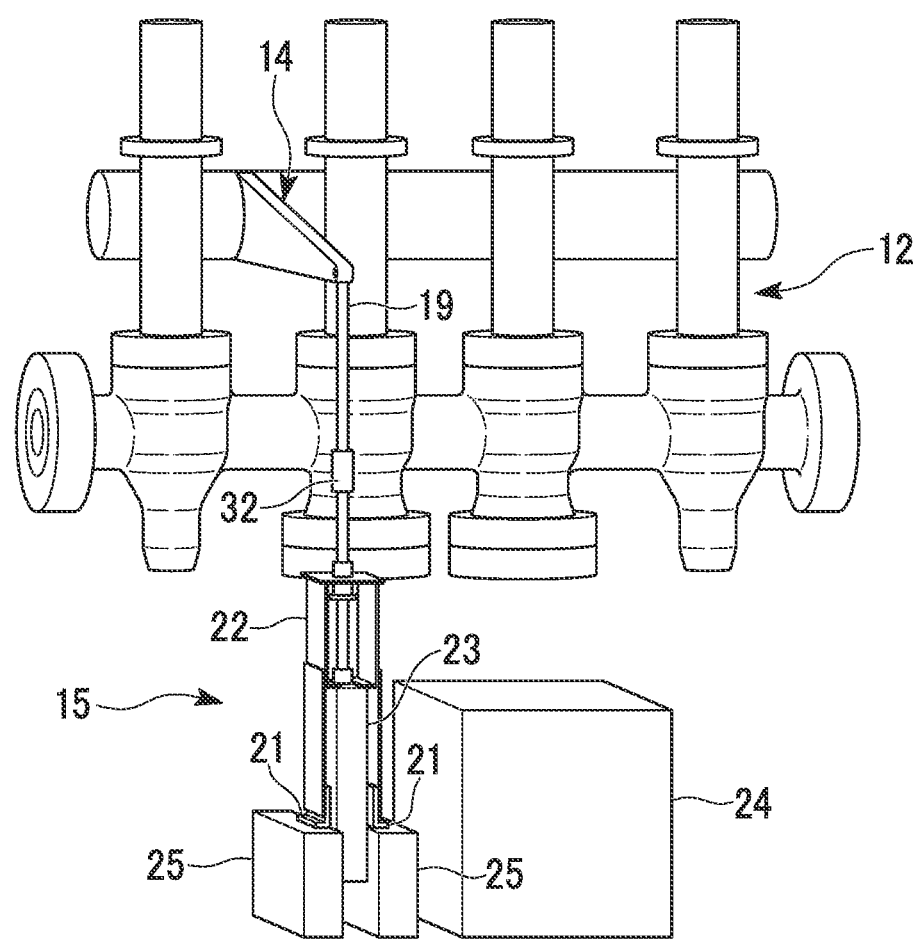
FIG. 2 is a schematic perspective view showing surroundings of an opening/closing drive mechanism.

FIG. 2 is a schematic perspective view showing surroundings of the opening/closing drive mechanism 15. In FIG. 2, the components related to the turbine main body 11 are not shown. The pair of brackets 21 constituting the opening/closing drive mechanism 15 have a cross-section of an approximate "L" shape, and are fixedly installed on pedestals 25 provided adjacent to the bearing cover 24. The bearing cover 24 houses the bearings 112 serving to rotatably support the rotating shaft 115 of the rotor 113 shown in FIG. 1.

The holding member 22 constituting the opening/closing drive mechanism 15 functions to hold the electric actuator 23. As shown in FIGS. 1 and 2, the holding member 22 has an approximate "U" shape when viewed from the side, and is rotatably supported by the pair of brackets 21.

Figure 3:
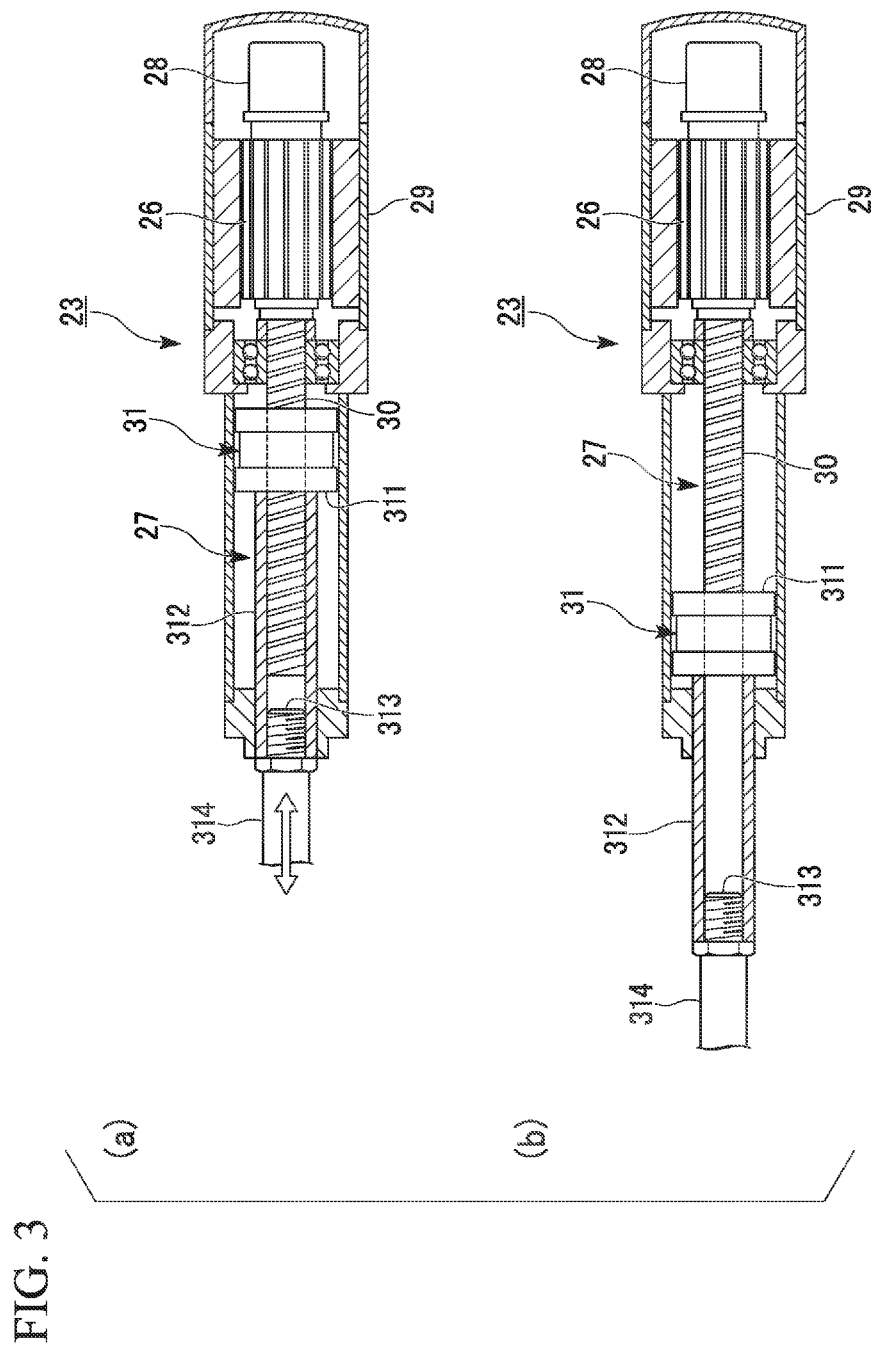
FIG. 3 is a schematic cross-sectional view showing an internal configuration of an electric actuator.

The electric actuator 23 constituting the opening/closing drive mechanism 15 generates a driving force for driving the regulating valve 13. FIG. 3 is a schematic cross-sectional view showing an internal configuration of the electric actuator 23. The electric actuator 23 is equipped with an electric motor 26, a conversion mechanism 27, and a brake 28.

The electric motor 26 rotates by power being supplied. As shown in FIG. 3(a), the electric motor 26 is housed in a motor housing 29 which is installed on a base end of the electric actuator 23 and whose interior is tightly closed. Thereby, the electric motor 26 is isolated from the oil therearound, and an explosion-proof structure is thereby formed.

The conversion mechanism 27 functions to convert rotational motion of the electric motor 26 into linear motion of the regulating valve 13. As shown in FIG. 3(a), the conversion mechanism 27 has a ball screw 30 connected to a driving shaft of the electric motor 26, and a piston unit 31 displaced backward and forward by the ball screw 30.

As shown in FIG. 3(a), the ball screw 30 is a long screw member, and male threads are cut on an outer circumferential surface thereof. One end of the ball screw 30 is connected to the driving shaft of the electric motor 26, and the ball screw 30 is rotatably driven with the rotation of the electric motor 26.

The piston unit 31 reciprocates along the ball screw 30. As shown in FIG. 3(a), the piston unit 31 has: a nut 311 that is a member having an approximately circular shape, has female threads cut on an inner circumferential surface thereof, and is screwed with the ball screw 30; a tubular piston rod 312 that is fixed to one end face of the nut 311 and covers an outside of the ball screw 30; a rod end connector 313 that is fitted and mounted into a tip of the piston rod 312; and an actuator-side rod 314, one longitudinal end of which is fixed to the rod end connector 313. According to the piston unit 31 configured in this way, when the ball screw 30 is rotated around its axis, the nut 311 screwed with the ball screw 30 moves along the axis, as shown in FIG. 3(b). In connection with this movement, the piston rod 312 fixed to the nut 311, the rod end connector 313, and the actuator-side rod 314 also move along the axis of the ball screw 30 along with the nut 311.

The brake 28 is a so-called regenerative brake. As shown in FIG. 3(a), the brake 28 is provided across the electric motor 26 at a position opposite to the ball screw 30, is operated by regenerative energy of the electric motor 26, and brakes the rotation of the electric motor 26. The operation of the brake 28 is controlled by the electronic governor 17 shown in FIG. 1. To be more specific, when a circumferential speed of the ball screw 30 is increased beyond a threshold, the electronic governor 17 operates the brake 28, thereby braking the rotation of the electric motor 26. Further, when the supply of power to the electric motor 26 is stopped due to a blackout, the electronic governor 17 operates the brake 28 for a given time from the stoppage of the supply of power, thereby braking the rotation of the electric motor 26.

Figure 4:
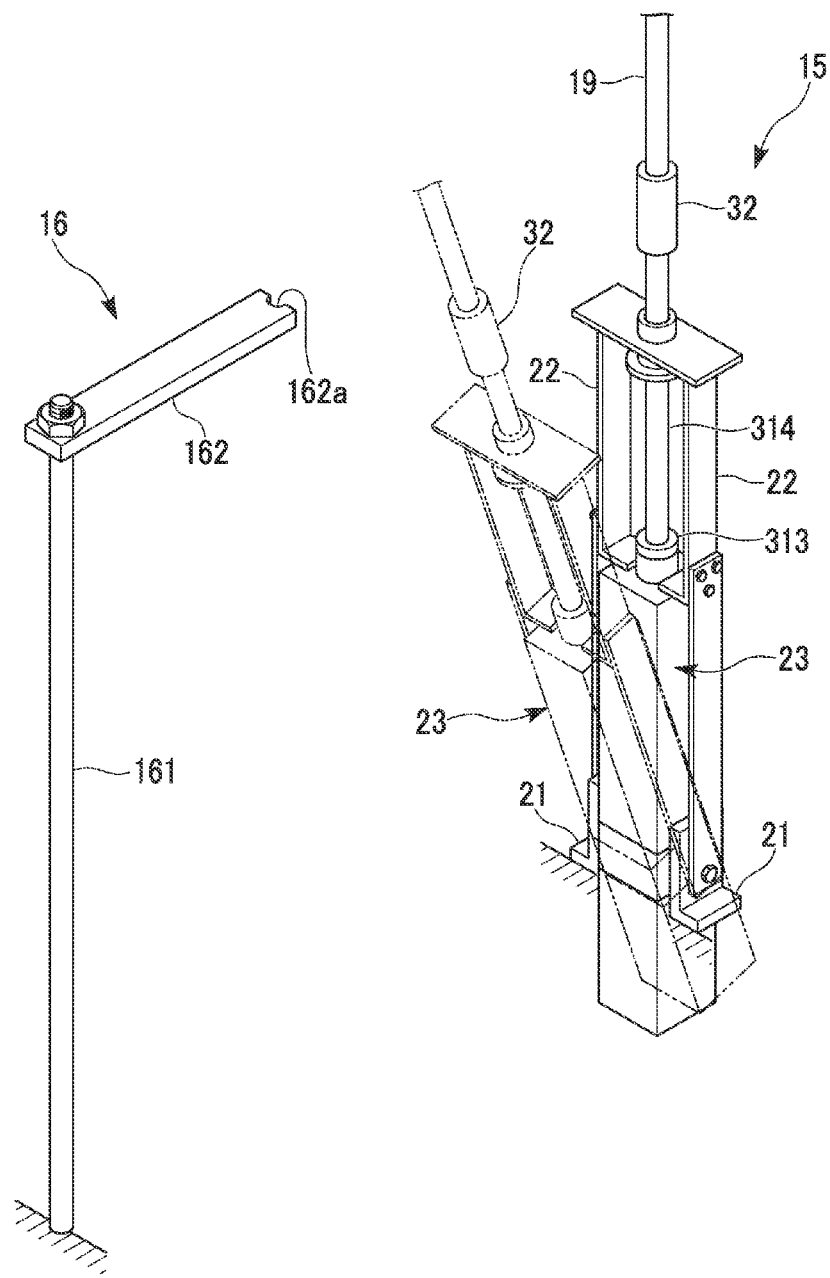
FIG. 4 is a schematic perspective view showing surroundings of the electric actuator.

FIG. 4 is a schematic perspective view showing surroundings of the electric actuator 23. The electric actuator 23 configured as described above is fixed to the holding member 22, and the actuator-side rod 314 is inserted into the holding member 22. The actuator-side rod 314 is connected to the lever-side rod 19 via a coupling 32. As indicated by a broken line in FIG. 4, the electric actuator 23 installed in this way is in a state in which slight rotation is allowed around a position at which the brackets 21 support the holding member 22 and which acts as a fulcrum.

Figure 5:
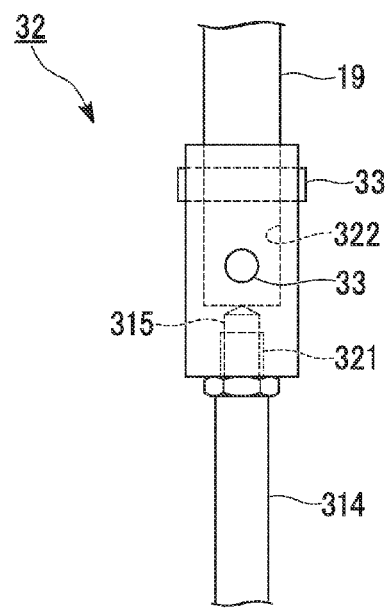
FIG. 5 is a schematic front view showing a configuration of a coupling.

FIG. 5 is a schematic front view showing a configuration of the coupling 32. The coupling 32 is a member having an approximately circular cylindrical shape, and has a threaded hole 321 formed in one end face thereof and a rod-inserting hole 322 formed in the other end face thereof. A fixing bolt 315 attached to the actuator-side rod 314 is screwed with the threaded hole 321 of the coupling 32, and thereby the coupling 32 and the actuator-side rod 314 are connected. Meanwhile, the lever-side rod 19 is inserted into the rod-inserting hole 322 of the coupling 32, and two pins 33 orthogonal to each other are inserted into the coupling 32 and the lever-side rod 19. Thereby, the coupling 32 and the lever-side rod 19 are connected. Thus, the actuator-side rod 314 and the lever-side rod 19 are connected via the coupling 32. Further, when the lever-side rod 19 is pulled out from the rod-inserting hole 322 by removing the two pins 33, the connection of the actuator-side rod 314 and the lever-side rod 19 can be released.

(Locking Mechanism)

Figure 6:
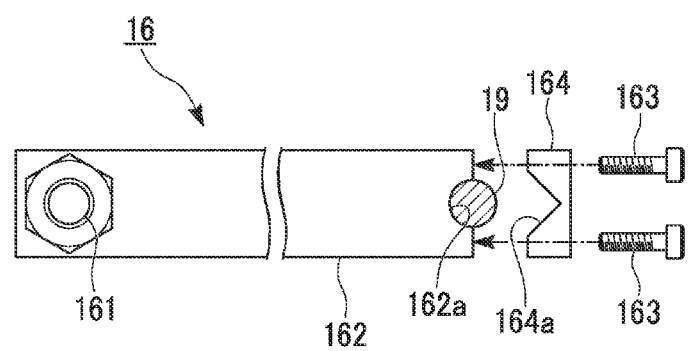
FIG. 6 is a schematic plan view showing a configuration of a locking mechanism.

The locking mechanism 16 functions to immovably lock the regulating valve 13. Here, FIG. 6 is a schematic plan view showing a configuration of the locking mechanism 16. As shown in FIGS. 4 and 6, the locking mechanism 16 has a supporting rod 161 whose lower end is fixed and which extends upward, a holding plate 162 that is supported on the supporting rod 161 and extends in a horizontal direction, and a pressing member 164 that is removably attached to a tip of the holding plate 162 via a pair of fixing bolts 163. Here, as shown in FIG. 4, the tip of the holding plate 162 is formed with a fitting recess 162a having an approximately semicircular shape when viewed from the top. Meanwhile, the pressing member 164 is formed with a notch 164a on a side thereof that faces the holding plate 162, and the notch 164a has an approximately triangular shape when viewed from the top.

According to the locking mechanism 16 configured in this way, after the lever-side rod 19 is fitted into the fitting recess 162a of the holding plate 162, the pressing member 164 is fixed to the tip of the holding plate 162 using the fixing bolts 163. Thereby, the lever-side rod 19 is sandwiched by the holding plate 162 and the pressing member 164, and is thereby locked to be immovable.

(Electronic Governor)

The electronic governor 17 controls an operation of the opening/closing drive mechanism 15. As shown in FIG. 1, results of process control are input into the electronic governor 17 based on results of detecting pressure and temperature in the compressor 18. Further, a rotation speed of the blades 116 which is detected by the speed-detecting sensor 114 constituting the turbine main body 11 is input into the electronic governor 17. Furthermore, an instruction input from a control panel 34 by a user is input into the electronic governor 17. On the basis of these inputs, the electronic governor 17 controls the operation of the opening/closing drive mechanism 15, more particularly the operation of the electric motor 26 constituting the electric actuator 23.

Figure 7:
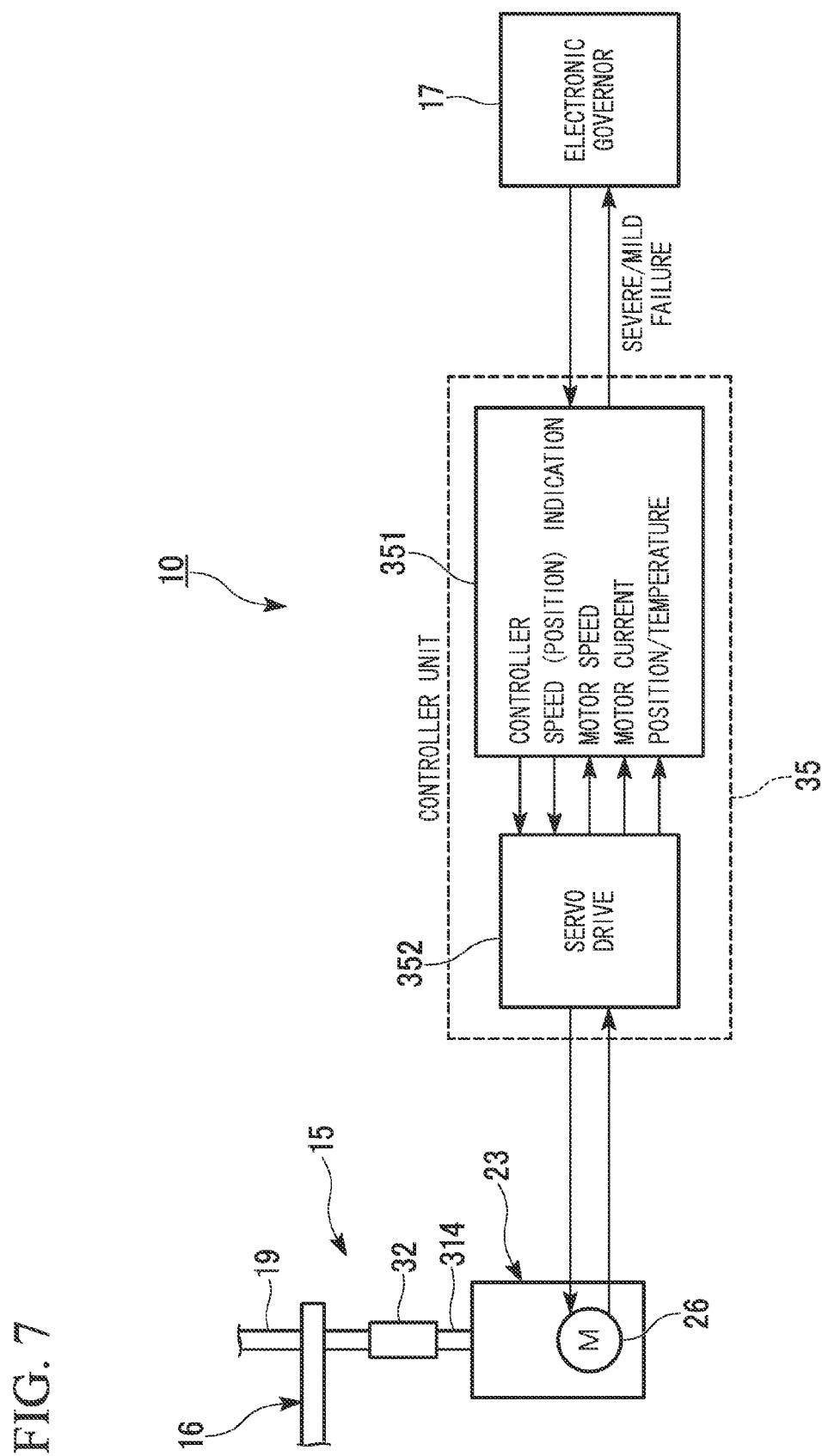
FIG. 7 is a schematic view showing control of the electric actuator in the steam turbine according to the first embodiment.

FIG. 7 is a schematic view showing control of the electric actuator 23 in the steam turbine 10 according to the first embodiment. In the steam turbine 10 according to the present embodiment, a controller unit 35 controls an operation of the electric actuator 23 based on the control of the electronic governor 17. The controller unit 35 has a controller 351 and a servo drive 352. With this configuration, the controller 351 gives an instruction on the rotation speed to the servo drive 352 under the control of the electronic governor 17, and the servo drive 352 gives power to the electric motor 26 based on the instruction. Meanwhile, a rotation speed, a current value, and a temperature of each place that are detected in the electric motor 26 are input into the controller 351 via the servo drive 352. When abnormality in the detected values is detected, the controller 351 informs the electronic governor 17 that a severe or mild failure has taken place in the electric motor.

Next, operation and effects of the steam turbine 10 according to the first embodiment of the present invention will be described. In the steam turbine 10 according to the first embodiment, the opening/closing drive mechanism 15 for driving the regulating valve 13 has the brake 28 that is operated by the regenerative energy of the electric motor 26 and brakes the rotation of the electric motor 26. With this configuration, the power supply to the electric motor 26 is stopped, the lever member 14 receiving the tensile force of the tension spring 20 is rotated counterclockwise in FIG. 1, and thus the regulating valve 13 closes the steam channel 12. Depending on the rotation of the lever member 14, the lever-side rod 19 is subjected to downward linear motion, and the conversion mechanism 27 converts the linear motion into rotational motion. Thereby, the electric motor 26 is rotated in a direction opposite to the rotational direction when it is typically driven. Here, the electric actuator 23 constituting the opening/closing drive mechanism 15 includes the brake 28 operated by the regenerative energy of the electric motor 26. For this reason, when the electric motor 26 is rotated in the reverse direction by the stoppage of power supply to the electric motor 26, the electric motor 26 is rotated in the reverse direction to generate the regenerative energy, and the brake 28 is operated using the regenerative energy as power. For this reason, the rotation speed of the electric motor 26 is prevented from being excessive. Thereby, in the conversion mechanism 27 converting the rotational motion of the electric motor 26 into the linear motion of the regulating valve 13, it is possible to prevent burn-in from being generated in advance by generation of excessive heat.

Figure 12:
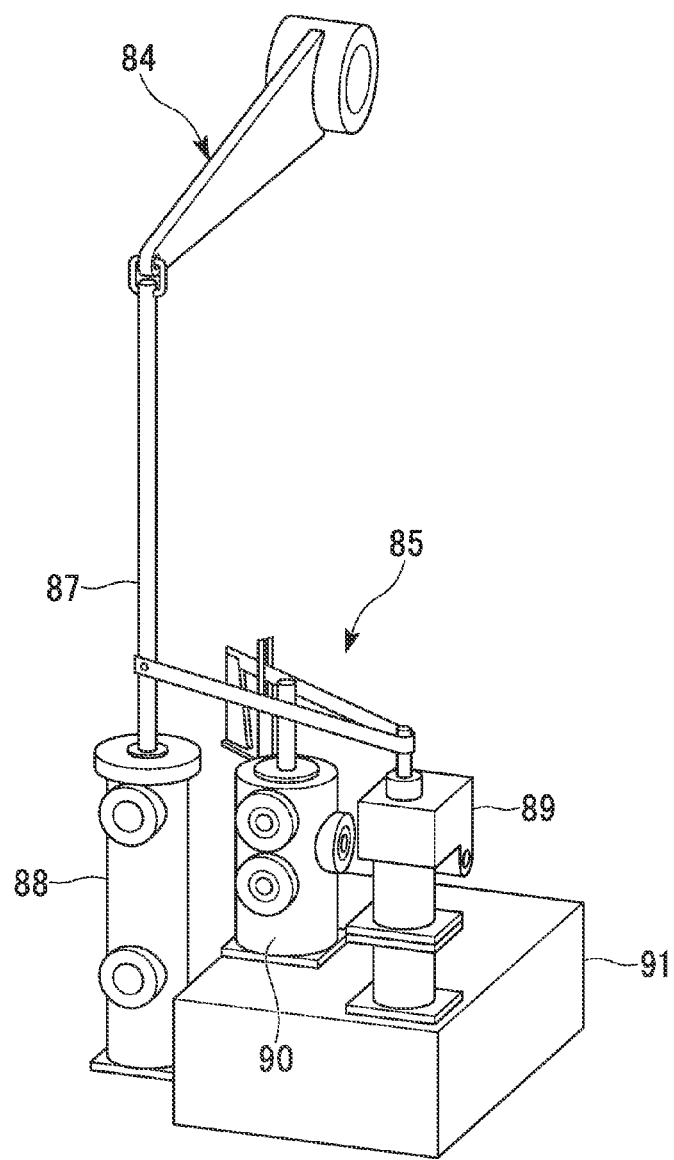
FIG. 12 is a schematic perspective view showing an installed state of a conventional hydraulic servomechanism.

Further, in the steam turbine 10 according to the first embodiment, the electric actuator 23 whose driving source is the electric motor 26 is used as the opening/closing drive mechanism 15 driving the regulating valve 13. Accordingly, a hydraulic servomechanism 85 that has been used to drive the regulating valve 13 is not required, and a means for preventing leakage of the hydraulic oil is not required. Further, an actuator (i.e. an actuator 90 shown in FIG. 12) supplying the hydraulic oil or a sealing valve mechanism (e.g. a pilot valve 89 shown in FIG. 12) is not required. As such, it is unnecessary to use the space above the bearing cover 24 as the installing space of the opening/closing drive mechanism 15. Thereby, whenever the maintenance work of the bearings 112 is performed, it is unnecessary to demount the opening/closing drive mechanism 15 from the top of the bearing cover 24, and effort required for the maintenance work of the bearings 112 can be reduced.

Further, since the hydraulic oil is used for only the bearings 112 shown in FIG. 1, the hydraulic oil can be used at a relatively low pressure. Thus, a high-powered pump or motor is not required, and the oil console can be made small.

Further, in the steam turbine 10 according to the first embodiment, to release a transverse force applied to the electric actuator 23, i.e., a force in a direction nearly perpendicular to the axial direction of the ball screw 30, the electric actuator 23 is in a state in which slight rotation is allowed, as indicated by the broken line in FIG. 4. To be more specific, since the lever member 14 shown in FIG. 1 is rotated around the base end thereof acting as the fulcrum, the tip thereof draws an arcuate track. Accordingly, the lever-side rod 19 fixed to the lever member 14 and the actuator-side rod 314 connected to the lever-side rod 19 also draw an arcuate track rather than simple axial linear motion. Thus, the rotation of the electric actuator 23 is allowed to release the force applied in a transverse direction, and thereby occurrence of a failure is prevented.

Further, in the steam turbine 10 according to the first embodiment, the lever-side rod 19 and the actuator-side rod 314 are separably connected via the coupling 32, and the lever-side rod 19 is adapted to be able to be immovably locked using the locking mechanism 16.

With this configuration, when the electric actuator 23 fails and needs to be exchanged, the lever-side rod 19 is locked by the locking mechanism 16 in a state in which the regulating valve 13 opens the steam channel 12, and then the coupling 32 is separated to release the connection of the lever-side rod 19 and the actuator-side rod 314. Thereby, it is possible to demount the electric actuator 23 to perform exchanging or repairing work while continuing the operation of the turbine main body 11.

Second Embodiment

Figure 8:
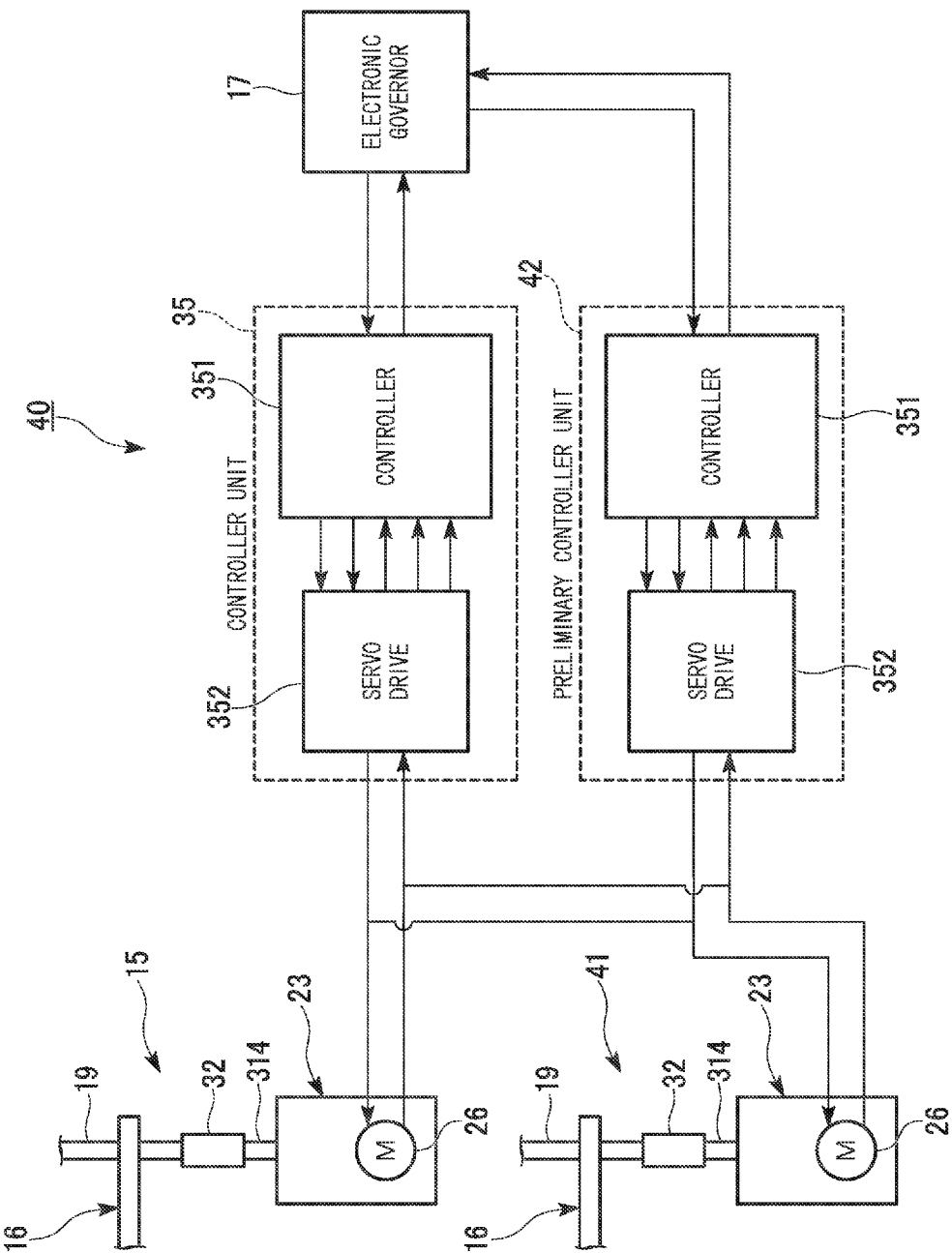
FIG. 8 is a schematic view showing control of an electric actuator in a steam turbine according to a second embodiment.

Next, a steam turbine according to a second embodiment of the present invention will be described. FIG. 8 is a schematic view showing control of an electric actuator 23 in a steam turbine 40 according to a second embodiment. In comparison with the steam turbine 10 of the first embodiment which is shown in FIG. 7, the steam turbine 40 of the present embodiment is different in that the opening/closing drive mechanism 15 and the controller unit 35 are made redundant. Since components other than these are identical to those of the first embodiment, the components are given the same symbols as in FIG. 1, and description thereof will be omitted here.

To be more specific, as shown in FIG. 8, the steam turbine 40 includes an opening/closing drive mechanism 15 acting as a means for driving a regulating valve 13 as well as a spare opening/closing drive mechanism 41. When the opening/closing drive mechanism 15 fails, the spare opening/closing drive mechanism 41 is adapted to drive the regulating valve 13 in place of the opening/closing drive mechanism 15. Thereby, since the steam turbine 40 can be continuously operated even when the opening/closing drive mechanism 15 fails, it is possible to increase reliability of the steam turbine 40.

Furthermore, as shown in FIG. 8, the steam turbine 40 also includes a controller unit 35 as well as a spare controller unit 42 as a means for controlling an operation of the opening/closing drive mechanism 15 or the spare opening/closing drive mechanism 41. When the controller unit 35 fails, the spare controller unit 42 controls the operation of the opening/closing drive mechanism 15 or the spare opening/closing drive mechanism 41 in place of the controller unit 35. Thereby, since the steam turbine 40 can be continuously operated even when the controller unit 35 fails, it is possible to increase reliability of the steam turbine 40.

In the present embodiment, the opening/closing drive mechanism 15 and the controller unit 35 are made redundant together. However, without being limited thereto, only the opening/closing drive mechanism 15 may be made redundant. In this case, both the operation of the opening/closing drive mechanism 15 and the operation of the spare opening/closing drive mechanism 41 may be controlled by the single controller unit 35. Further, only the controller unit 35 may be made redundant. In this case, the operation of the single opening/closing drive mechanism 15 may be controlled by any one of the controller unit 35 and the spare controller unit 42.

Third Embodiment

Figure 9:
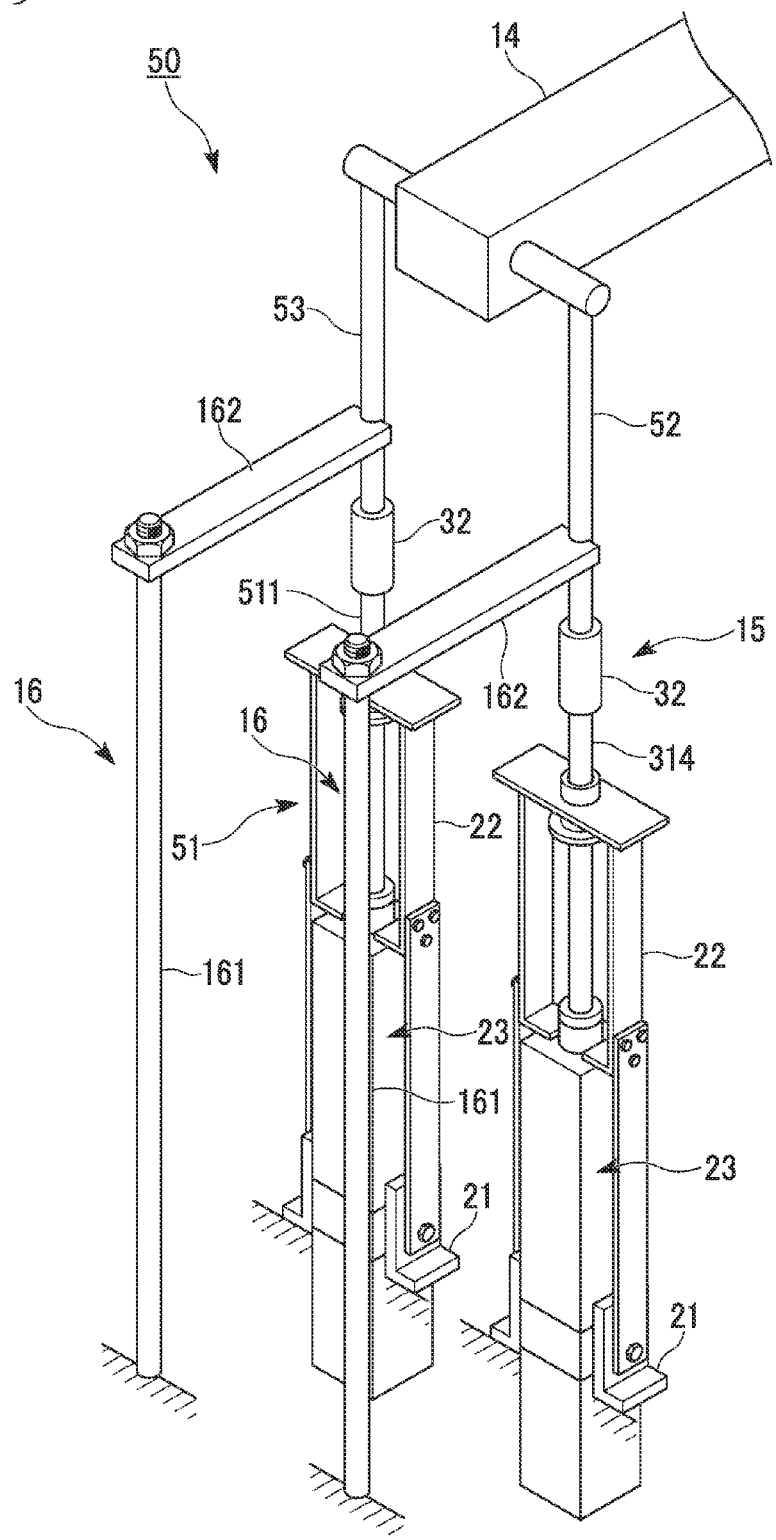
FIG. 9 is a schematic perspective view showing surroundings of a tip of a lever member in a steam turbine according to a third embodiment.

Next, a steam turbine according to a third embodiment of the present invention will be described. FIG. 9 is a schematic perspective view showing surroundings of a tip of a lever member 14 in a steam turbine according to a third embodiment. In comparison with the steam turbine 10 of the first embodiment which is shown in FIG. 2, the steam turbine 50 of the present embodiment is different in that, as a means for driving a regulating valve 13, an auxiliary opening/closing drive mechanism 51 is further provided in addition to an opening/closing drive mechanism 15. Here, since the auxiliary opening/closing drive mechanism 51 has the same configuration as the opening/closing drive mechanism 15, the same members are given the same symbols, and description thereof will be omitted. Further, since components other than these are identical to those of the first embodiment, the components are given the same symbols, and description thereof will be omitted here.

To be more specific, as shown in FIG. 9, one end of a first lever-side rod 52 is fixed to one lateral portion of a lever member 14, and one end of a second lever-side rod 53 is fixed to the other lateral portion of the lever member 14. The other end of the first lever-side rod 52 is connected to an actuator-side rod 314 of the opening/closing drive mechanism 15 via a coupling 32. On the other hand, the other end of the second lever-side rod 53 is connected to an actuator-side rod 511 of the auxiliary opening/closing drive mechanism 51 via another coupling 32. Thereby, the regulating valve 13 can be driven via the lever member 14 by both the opening/closing drive mechanism 15 and the auxiliary opening/closing drive mechanism 51.

Figure 10:
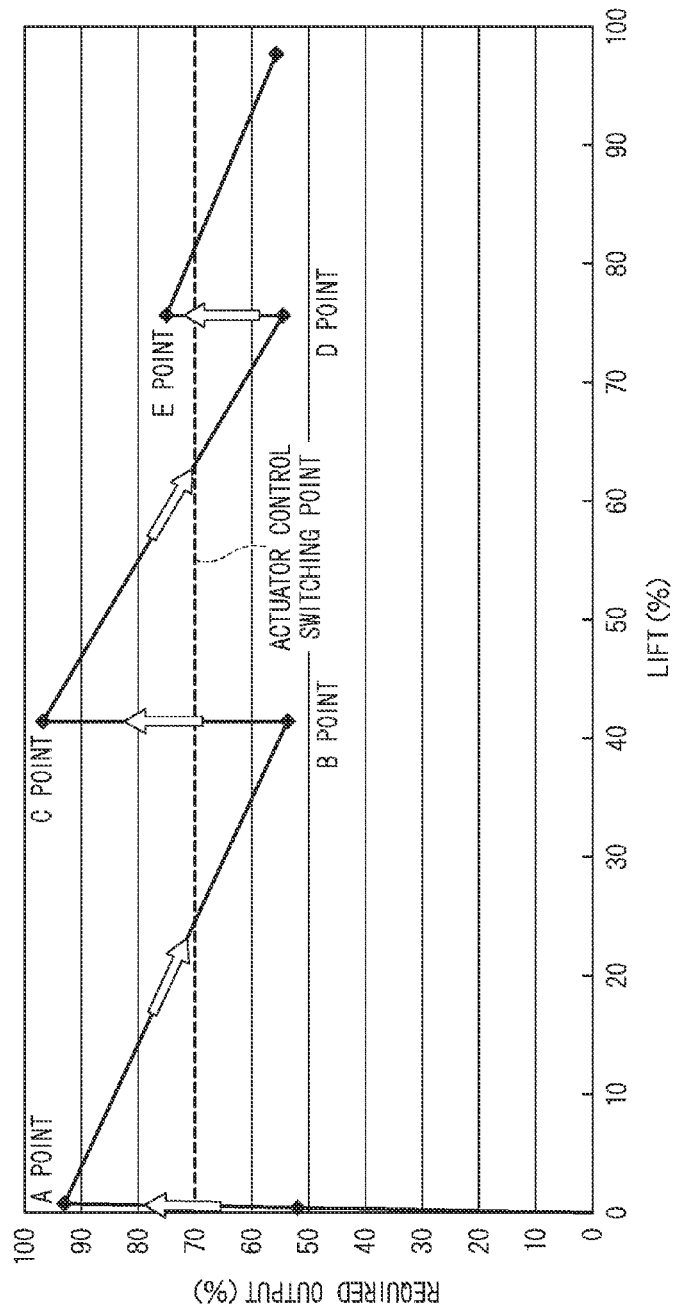
FIG. 10 is a view for describing operation and effects of the steam turbine according to the third embodiment.
Figure 11:
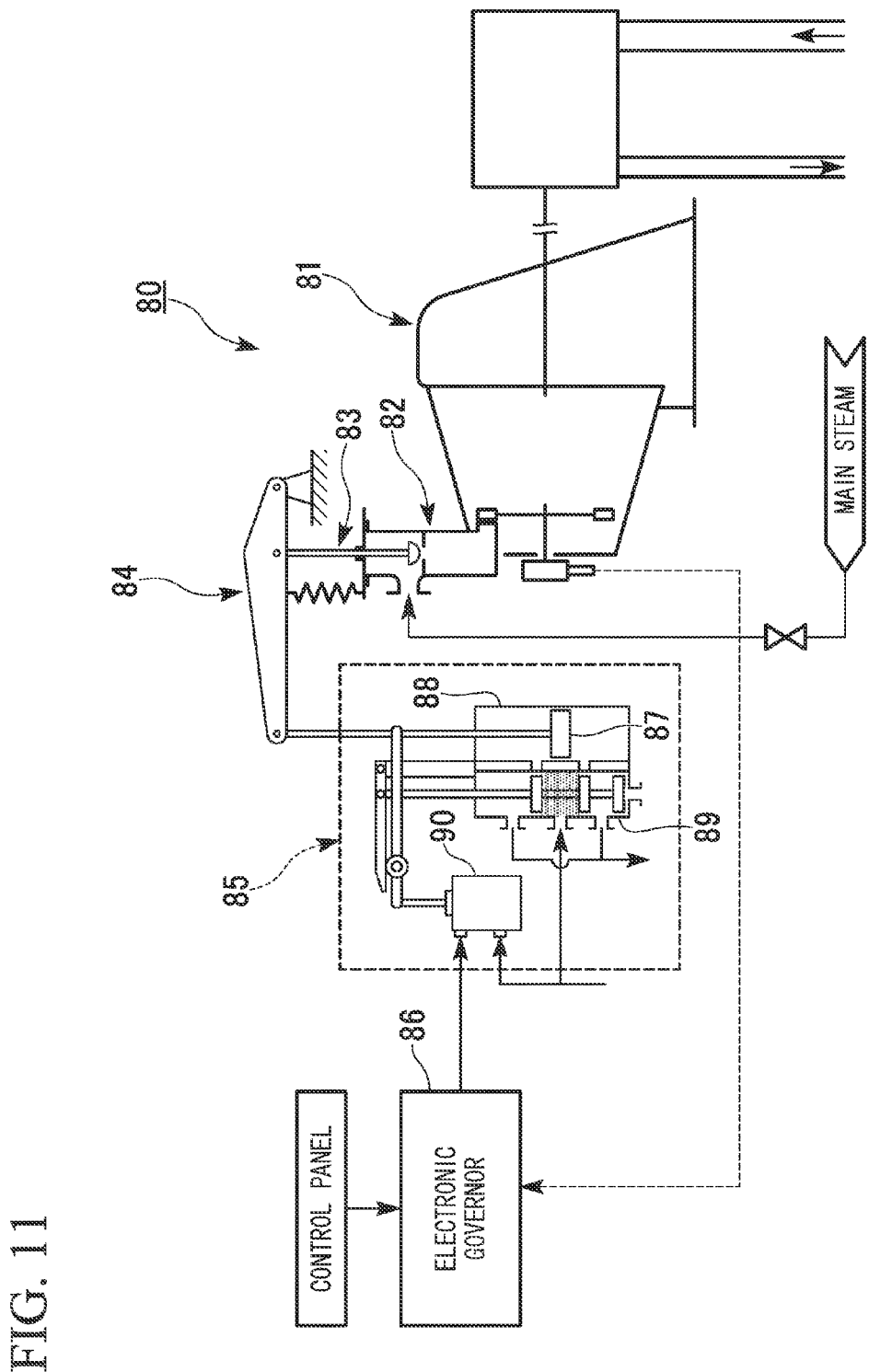
FIG. 11 is a schematic view showing a configuration of a conventional steam turbine.

FIG. 10 is a view for describing operation and effects of the steam turbine 50 according to the third embodiment, wherein a transverse axis indicates lift, i.e., a lifting amount, of a lever, and a longitudinal axis indicates output required to drive the regulating valve 13. The steam turbine 50 typically has a plurality of regulating valves 13. These regulating valves 13 have different levels of the output required for their driving. Further, in the case of the required output for each regulating valve 13, the maximum output is required at a point in time at which the regulating valve 13 begins to open the steam channel 12, and the required output is gradually reduced along with transition to a normal operation. The maximum output is required when the steam channel 12 begins to be opened because there is a need to push up the lever member 14 against the tensile force of the tension spring 20 shown in FIG. 1. In this way, since the output required to drive the regulating valve 13 is changed over time, the opening/closing drive mechanism 15 and the auxiliary opening/closing drive mechanism 51 are properly used depending on the required output in the present embodiment.

For example, at a point O shown in FIG. 10, when a first regulating valve (not shown) initiates an opening operation of the steam channel 12, the output of about 95% is required. As such, the first regulating valve 13 is driven using both the opening/closing drive mechanism 15 and the auxiliary opening/closing drive mechanism 51. After the output reaches about 95% at a point A, the required output is gradually reduced along with the transition to the normal operation. After the required output is reduced beyond a line of about 70%, which is a predetermined reference value, the auxiliary opening/closing drive mechanism 51 is stopped, and the first regulating valve 13 is driven using only the opening/closing drive mechanism 15.

Afterwards, at a point B, when a second regulating valve (not shown) initiates the opening operation of the steam channel 12, the output of about 95% is required like the first regulating valve 13. As such, the second regulating valve is driven using both the opening/closing drive mechanism 15 and the auxiliary opening/closing drive mechanism 51. After the output reaches about 95% at a point C, the required output is gradually reduced along with the transition to the normal operation. After the required output is reduced beyond about 70%, which is the reference value, the second regulating valve is driven using only the opening/closing drive mechanism 15.

Subsequently, at a point D, when a third regulating valve (not shown) initiates the opening operation of the steam channel 12, the output of about 75% is required. As such, the third regulating valve is driven using both the opening/closing drive mechanism 15 and the auxiliary opening/closing drive mechanism 51. After the output reaches about 75% at a point E, the required output is gradually reduced along with the transition to the normal operation. After the required output is reduced beyond about 70%, which is the reference value, the third regulating valve is driven using only the opening/closing drive mechanism 15.

In this way, the opening/closing drive mechanism 15 and the auxiliary opening/closing drive mechanism 51 are properly used to supply only the required output. Thereby, it is possible to promote energy saving.

While preferred embodiments of the present invention have been described, the present invention is not limited to the embodiments. Additions, omissions, substitutions, and other variations of the configuration are possible without departing from the scope of the present invention. The present invention is not limited by the above description, but by the appended claims.

INDUSTRIAL APPLICABILITY

The present invention relates to a steam turbine that is rotatably driven by steam. According to the steam turbine of the present invention, a regulating valve regulating an amount of the steam can be stably driven over a long period, and an opening/closing drive mechanism of the regulating valve does not interfere with maintenance work of bearings.

REFERENCE SIGNS LIST 10 steam turbine
11 turbine main body
111 casing
112 bearing
113 rotor
114 speed-detecting sensor
115 rotating shaft
116 blade
12 steam channel
121 steam introduction opening
122 steam supply opening
123 throttling hole
13 regulating valve
131 arm member
132 sealing member
14 lever member
15 opening/closing drive mechanism
16 locking mechanism
161 supporting rod
162 holding plate
162a fitting recess
163 fixing bolt
164 pressing member
164a notch
17 electronic governor
18 compressor
19 lever-side rod
20 tension spring
21 bracket
22 holding member
23 electric actuator
24 bearing cover
25 pedestal
26 electric motor
27 conversion mechanism
28 brake
29 motor housing
30 ball screw
31 piston unit
311 nut
312 piston rod
313 rod end connector
314 actuator-side rod
315 fixing bolt
32 coupling
321 threaded hole
322 rod-inserting hole
33 pin
34 control panel
35 controller unit
351 controller
352 servo drive
40 steam turbine
41 spare opening/closing drive mechanism
42 spare controller unit
50 steam turbine
51 auxiliary opening/closing drive mechanism
511 actuator-side rod
52 first lever-side rod
53 second lever-side rod
80 steam turbine
81 turbine main body
82 steam channel
83 regulating valve
84 lever member
85 hydraulic servomechanism
86 electronic governor
87 piston
88 hydraulic cylinder
89 pilot valve
90 actuator
91 bearing cover

The invention claimed is:

1. A steam turbine comprising:
a turbine main body having blades supported rotatably;
a steam channel which is connected to the turbine main body and in which steam flows;
a regulating valve configured to linearly move to adjust opening/closing of the steam channel;
an opening/closing drive mechanism configured to drive the regulating valve; and
a lever member provided so that a longitudinal base end of the lever member is rotatably supported, a longitudinal tip of the lever member is connected to the opening/closing drive mechanism, and a longitudinal intermediate portion of the lever member is connected to the regulating valve,
wherein the opening/closing drive mechanism includes:
an electric actuator generating a driving force for driving the regulating valve;
a holding member holding the electric actuator; and
a bracket rotatably supporting the holding member,
wherein the electric actuator includes:
an electric motor configured to rotate by an electric power being supplied;
a conversion mechanism configured to convert rotational motion of the electric motor into linear motion of the regulating valve; and
a brake operated by regenerative energy of the electric motor, wherein one end of a tension spring acting as a forcible closing means for forcibly closing the regulating valve is attached to a portion of the lever member located closer to the longitudinal tip of the lever member than a position in which the regulating valve is connected to the lever member, wherein the conversion mechanism comprises:
- a ball screw that is rotatably driven by the electric motor;
- a nut that is screwed with the ball screw and is connected to the regulating valve; and
- a rod that is connected to the longitudinal tip of the lever member and is fixed to the nut, the rod being displaceable backward and forward by the rotation of the ball screw along an axis of the ball screw, and wherein the holding member and the electric actuator are rotated by the rotation of the lever member.

2. The steam turbine according to claim 1, wherein the electric motor is housed in a motor housing whose interior is tightly closed.

3. The steam turbine according to claim 2, further comprising a spare opening/closing drive mechanism configured to drive the regulating valve when the opening/closing drive mechanism fails.

4. The steam turbine according to claim 3, further comprising a controller unit configured to control an operation of the opening/closing drive mechanism or the spare opening/closing drive mechanism.

5. The steam turbine according to claim 4, further comprising a spare controller unit configured to control the operation of the opening/closing drive mechanism or the spare opening/closing drive mechanism when the controller unit fails.

6. The steam turbine according to claim 1, further comprising a spare opening/closing drive mechanism configured to drive the regulating valve when the opening/closing drive mechanism fails.

7. The steam turbine according to claim 6, further comprising a controller unit configured to control an operation of the opening/closing drive mechanism or the spare opening/closing drive mechanism.

8. The steam turbine according to claim 7, further comprising a spare controller unit configured to control the operation of the opening/closing drive mechanism or the spare opening/closing drive mechanism when the controller unit fails.

9. The steam turbine according to claim 1, wherein the brake is configured to operate when a circumferential speed of the ball screw is increased beyond a threshold, or for a given time after supply of power to the electric motor is stopped.

10. The steam turbine according to claim 1, further comprising a coupling configured to separably connect the nut and the regulating valve, and a locking mechanism configured to immovably lock the regulating valve.

11. The steam turbine according to claim 1, further comprising an auxiliary opening/closing drive mechanism configured to drive the regulating valve along with the opening/closing drive mechanism when high output exceeding a reference value is required to drive the regulating valve.

* * * * *